US012719323B2

(12) United States Patent
Liang et al.

(10) Patent No.: US 12,719,323 B2
(45) Date of Patent: Aug. 25, 2026

(54) THREE-PHASE DRIVEN STATOR STRUCTURE AND FAN USING SAME

(71) Applicant: ASIA VITAL COMPONENTS (CHINA) CO., LTD., Shenzhen (CN)

(72) Inventors: Liqiu Liang, Shenzhen (CN); Heyan Liu, Shenzhen (CN)

(73) Assignee: ASIA VITAL COMPONENTS (CHINA) CO., LTD., Shenzhen (CN)

( * ) Notice: Subject to any disclaimer, the term of this patent is extended or adjusted under 35 U.S.C. 154(b) by 264 days.

(21) Appl. No.: 18/654,193

(22) Filed: May 3, 2024

(65) Prior Publication Data

US 2025/0323544 A1 Oct. 16, 2025

(30) Foreign Application Priority Data

Apr. 11, 2024 (TW) ................................ 113113610

(51) Int. Cl.
*H02K 3/26* (2006.01)
*F04D 25/06* (2006.01)

(52) U.S. Cl.
CPC ............... *H02K 3/26* (2013.01); *F04D 25/06* (2013.01); *H02K 2203/03* (2013.01)

(58) Field of Classification Search
CPC .. H02K 3/26; H02K 3/04; H02K 3/00; H02K 2203/03; F04D 25/06; F04D 25/00; F04D 25/02
See application file for complete search history.

(56) References Cited

U.S. PATENT DOCUMENTS 7,112,910 B2 * 9/2006 Lopatinsky ............ H02K 21/24 310/156.32
2006/0045773 A1 * 3/2006 Ku ........................ F04D 25/066 417/423.3

(Continued)

FOREIGN PATENT DOCUMENTS

CN 103986254 A * 8/2014
CN 110100372 A 8/2019

(Continued)

OTHER PUBLICATIONS

Machine Translation of CN 103986254 A (Year: 2014).*

(Continued)

*Primary Examiner* — Alexander A Singh
*Assistant Examiner* — Charlie Frank Mann, Jr.
(74) *Attorney, Agent, or Firm* — Demian K. Jackson; Jackson IPG PLLC

(57) ABSTRACT

A three-phase stator structure includes a plurality of laminated substrates, each of which is provided with a tracing layer, a plurality of through holes, and a plurality of electrical connection vias. The tracing layer consists of a plurality of induction coils, which are respectively arranged around an outer side of one of the through holes. The electrical connection vias are internally provided with an electrically conducting material, with which the induction coils on one substrate can be extended and electrically connected to the induction coils on an adjacent substrate. Every through hole has a metal rod inserted therein to enable upgraded magnetic force of the induction coils. A fan using the three-phase stator structure is also disclosed. With the three-phase driven stator structure, the fan can be slimmed while maintain good inductive-excited magnetic force and accordingly, high rotational speed and sufficient air volume.

8 Claims, 4 Drawing Sheets

(56) References Cited

U.S. PATENT DOCUMENTS

| | | | | |
|---|---|---|---|---|
| 2012/0119606 | A1 * | 5/2012 | Chen | H02K 1/146 310/198 |
| 2019/0115129 | A1 | 4/2019 | Kim et al. | |

FOREIGN PATENT DOCUMENTS

| | | | | | |
|---|---|---|---|---|---|
| CN | 113315333 | A | * | 8/2021 | H02K 29/08 |
| CN | 117294102 | A | | 12/2023 | |
| EP | 3568899 | B1 | * | 3/2022 | H02K 1/182 |
| TW | 144640 | U | | 10/1990 | |
| WO | WO-2017183837 | A1 | * | 10/2017 | H02K 1/12 |
| WO | WO-2018117629 | A1 | * | 6/2018 | H02K 3/26 |

OTHER PUBLICATIONS

Machine Translation of CN 113315333 A (Year: 2021).*
Machine Translation of WO 2017183837 A1 (Year: 2017).*
Text Version of EP 3568899 B1 (Year: 2022).*
Machine Translation of WO 2018117629 A1 (Year: 2018).*

* cited by examiner

THREE-PHASE DRIVEN STATOR STRUCTURE AND FAN USING SAME

This application claims the priority benefit of Taiwan patent application number 113113610 filed on Apr. 11, 2024, the disclosure of which is hereby incorporated by reference in its entirety.

FIELD OF THE INVENTION

The present invention relates to a three-phase driven stator structure and a fan using same. With the three-phase driven stator structure, the fan can be a slim fan having sufficient stator magnetic force to maintain good fan rotational speed and produce sufficient air volume.

BACKGROUND OF THE INVENTION

Most of the currently available miniature slim fan designs employ silicon steel laminations with wound coils as the stator for inductive-exciting the blades of a rotor. Since the miniature fan is limited in height, the use of too many silicon steel laminations and wound coils would disadvantageously increase the overall height of the fan. How, the magnetic force of the stator is determined by the number of the silicon steel laminations and the wound coils. It is difficult to reduce the number of the silicon steel laminations and the wound coils of the slim fan while expecting the stator thereof to have the same or even higher magnetic force.

In the case of a single-phase driven fan, the position for placing the Hall element is also limited in consideration of the induction effect of the Hall element. As a result, the height of the fan could not be further reduced. The design of three-phase windings has been used to solve the disadvantages in the prior art slim fans. The printing of windings directly on the circuit board is also used to replace the conventional silicon steel laminations and coils. While the three-phase windings and the printed windings can satisfy the requirement of manufacturing a slim fan, the magnetic force of the printed windings after supplying electric current thereto is relatively small. Therefore, the conventional slim fan has relatively low rotational speed and torque and can produce only very limited air volume.

It is therefore tried by the inventor to work out a way for a slim fan to maintain good fan characteristics and performance.

SUMMARY OF THE INVENTION

A primary object of the present invention is to effectively solve the above problems by providing a slim fan having a three-phase driven stator structure, so that the slim fan can still have good inductive-excited magnetic force to maintain good fan rotational speed and produce sufficient air volume.

To achieve the above and other objects, the present invention discloses a three-phase driven stator structure, which includes a plurality of substrates; each of which is has at least one tracing layer, a plurality of through holes, and a plurality of electrical connection vias provided thereon. The through holes extend through two sides of the substrate. The tracing layer consists of a plurality of induction coils, each of which is arranged around one of the through holes to form a radial pattern. The electrical connection vias provide electrical conducting paths of extension for the induction coils on one substrate to extend and electrically connect to the induction coils on an adjacent substrate. Every through hole has a metal rod inserted therein.

To achieve the above and other objects, the present invention also provides a fan using a three-phase driven stator structure. The fan includes a frame, a rotor, and the above-described three-phase driven stator structure. The frame has a bottom, a shaft barrel extended upward from the bottom, and a bearing fitted in the shaft barrel. The substrates of the three-phase driven stator structure are disposed on the bottom of the frame around the shaft barrel. The rotor includes a hub, a plurality of blades extended radially outward from a circumferential outer surface of the hub, a magnetic element disposed at an underside of the hub corresponding to the induction coils on the substrates, and a shaft vertically extended downward from a center of a lower inner side of the hub for correspondingly inserting into the bearing in the shaft barrel to be pivotally connected to the shaft barrel.

With the above arrangements, the fan can have a slimmed configuration. Since every through hole on the substrates has a metal rod inserted therein, the induction coils can have increased magnetic force. Therefore, the fan with the three-phase driven stator structure of the present invention is able to overcome the problems of the conventional slim fan that the stator has insufficient magnetic force and loses fan characteristics. Besides, the fan of the present invention does not require additional small round iron pieces for positioning starting.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof.

Figure 1:
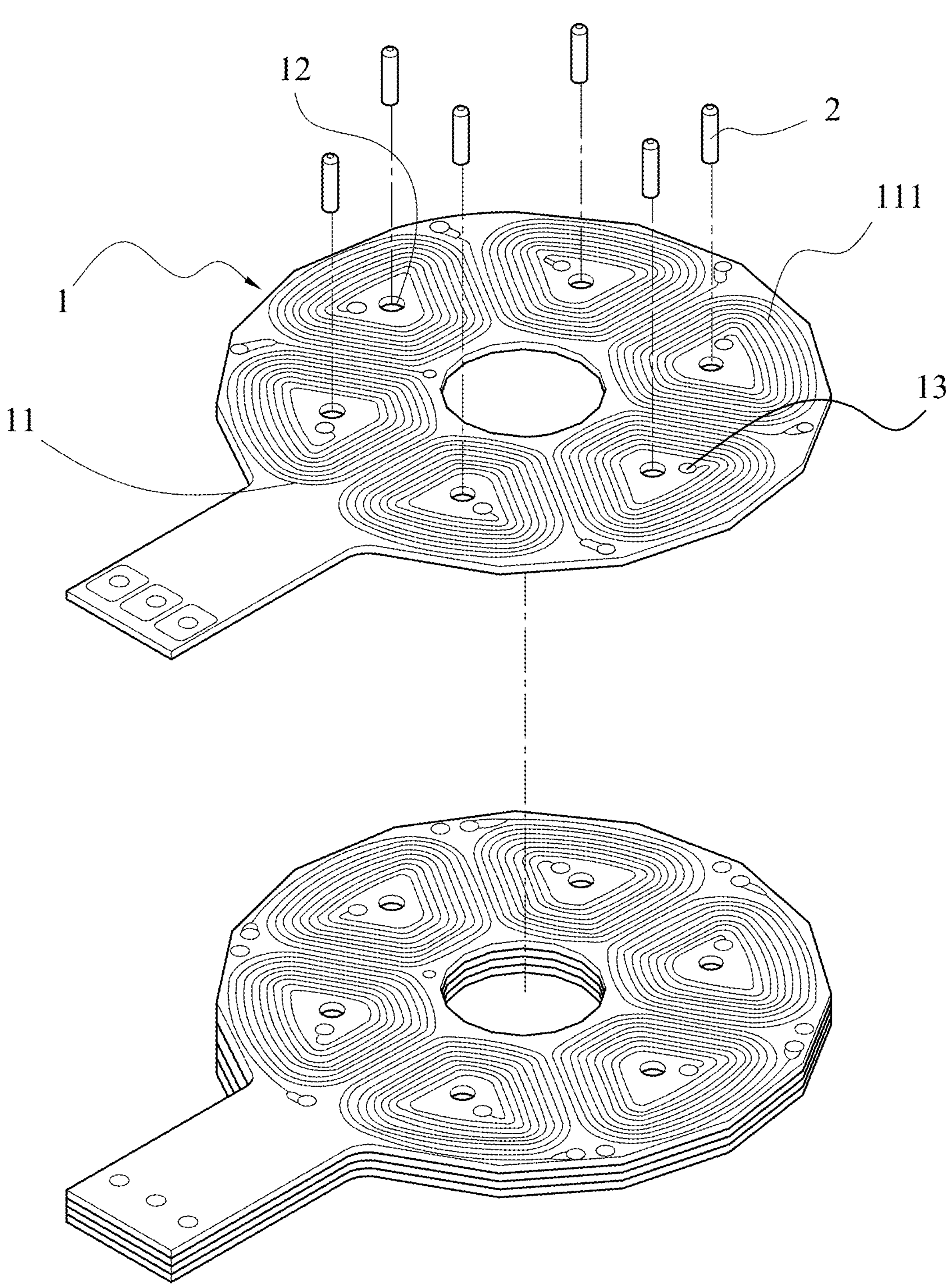
FIG. 1 is a partially exploded perspective view of a three-phase driven stator structure according to a preferred embodiment of the present invention.
Figure 2:
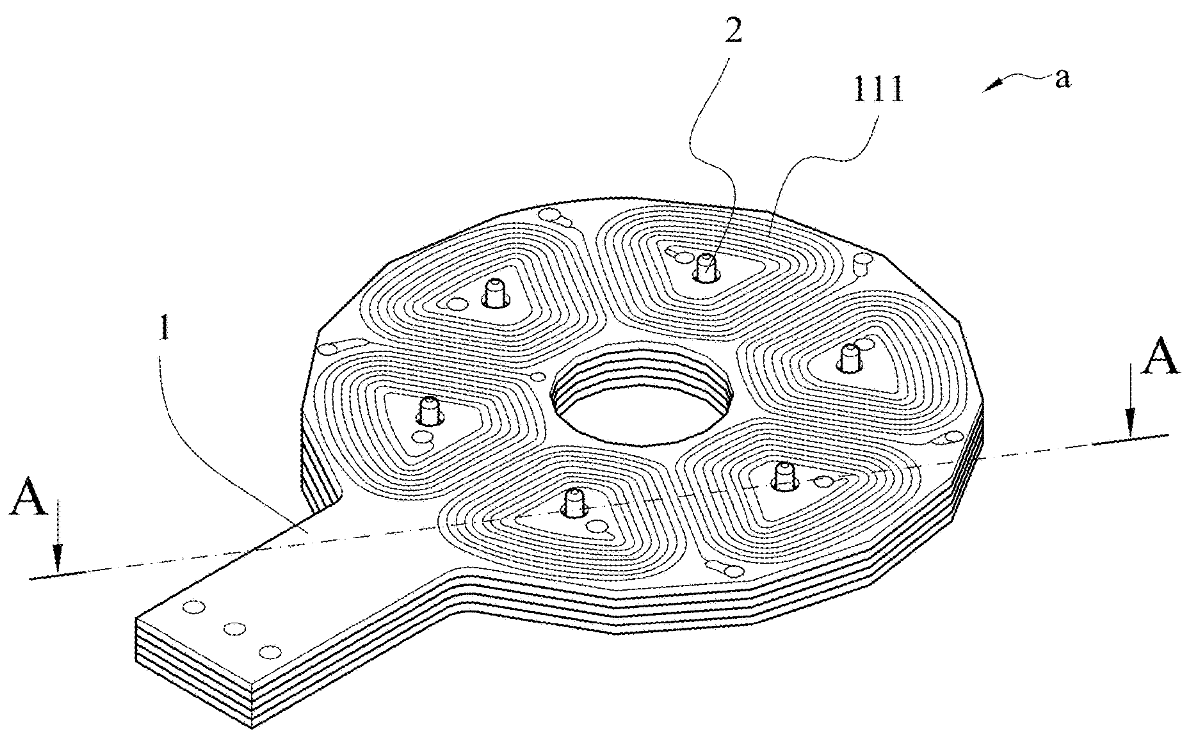
FIG. 2 is an assembled view of FIG. 1.
Figure 3:
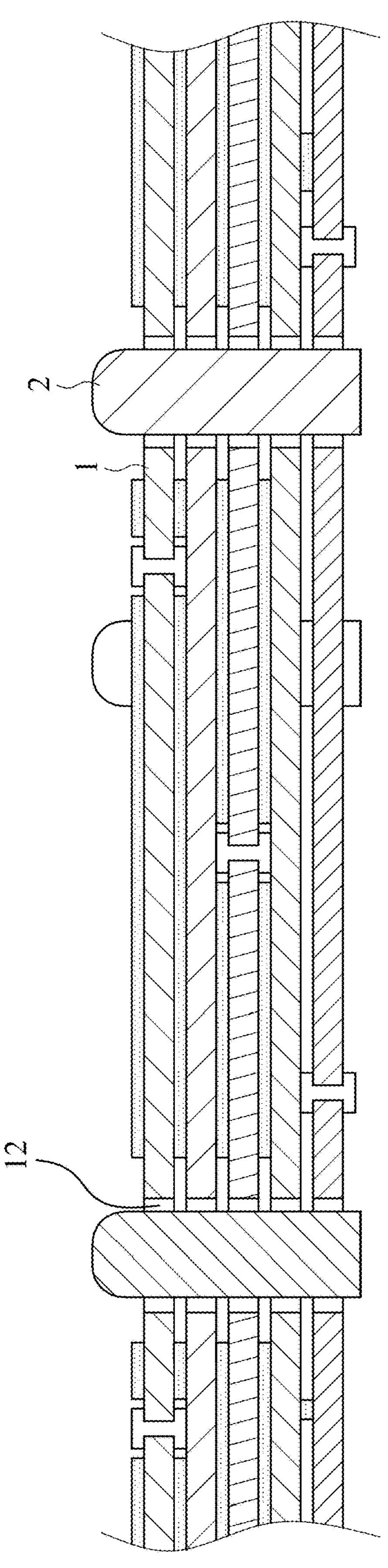
FIG. 3 is a fragmentary assembled sectional side view of the three-phase driven stator structure according to the preferred embodiment of the present invention as shown in FIGS. 1 and 2.

Please refer to FIGS. 1 and 2, which are partially exploded perspective view and assembled perspective view, respectively, of a three-phase driven stator structure 'a' according to a preferred embodiment of the present invention, and to FIG. 3, which is an assembled sectional side view of the three-phase driven stator structure 'a'. As shown, the three-phase driven stator structure 'a' includes a plurality of laminated substrates 1. Each of the substrates 1 is provided on at least one of two sides (upper and lower sides) thereof with a tracing layer 11, a plurality of through holes 12, and a plurality of electrical connection vias 13. The tracing layer 11 consists of a plurality of induction coils 111, which are respectively arranged around an outer side of one of the through holes 12 and together form a radial pattern on the substrate 1. All the through holes 12 and the electrical connection vias 13 penetrate the substrate 1 from the upper to the lower side. The electrical connection vias 13 are internally provided with an electrically conducting material to serve as paths of extension, and the induction coils 111 on two adjacent substrates 1 are electrically connected to one another through the electrical connection vias 13. The electrical conducting material applied in the vias 13 may be copper, nickel or silver and extends from the vias 13 to the tracing layer 11 of another substrate 1 to provide electrical connection between the tracing layers 11 on two adjacent substrates 1. Every through hole 12 has a metal rod 2 inserted therein, and the metal rods 2 are spaced from the induction coils 111 without contacting with one another.

The induction coils 111 are formed on the substrates 1 through printing or etching, and have a three-phase output. The three phases are represented by alphabets U, V, and W. And, each of the tracing layers 11 has three, six, or nine induction coils 111 arrayed thereon side by side but spaced from one another. In other words, the number of the induction coils 111 provided on each substrate 1 is a multiple of three (3).

Figure 4:
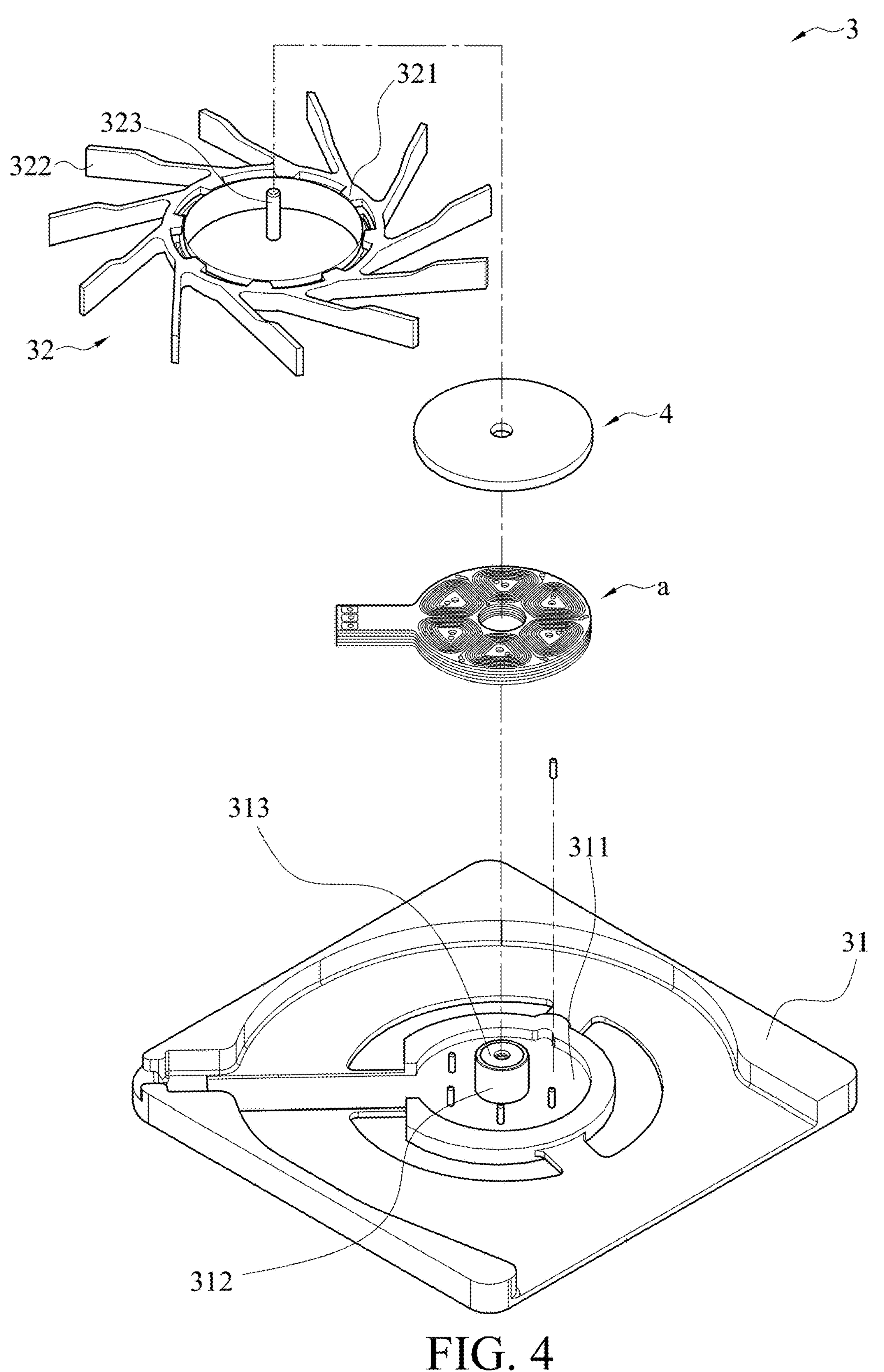
FIG. 4 is an exploded perspective view of a fan using the three-phase driven stator structure according to the present invention.

Please refer to FIG. 4, which is an exploded perspective view of a fan 3 using the three-phase driven stator structure 'a' of the present invention. As shown, the fan 3 includes a frame 31, the three-phase driven stator structure 'a', and a rotor 32.

The frame 31 includes a bottom 311, a shaft barrel 312 extending upward from the bottom 311 and being internally provided with a bearing 313. The substrates 1 are disposed on the bottom 311 and located around an outer side of the shaft barrel 312.

The rotor 32 includes a hub 321, a plurality of blades 322 extended radially outward from an outer circumferential surface of the hub 321, a magnetic element 4 disposed an underside of the hub 321 at a position corresponding to the induction coils 111, and a shaft 323 vertically extended downward from a center of a lower inner side of the hub 321 for correspondingly inserting into the shaft barrel 312 and the bearing 313 to be rotatably connected to the shaft barrel 312 of the frame 31.

In the prior art, the slim fan usually has insufficient stator magnetic force to adversely affect an overall fan rotational speed or produced air volume. In the present invention, the provision of the metal rods and the induction coils enables the slim fan to have upgraded stator inductive-excited magnetic force to improve the rotational speed of and the air volume produced by the slim fan. That is, the slim fan according to the present invention would not lose its fan characteristics due to its slimmed configuration.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A three-phase driven stator structure, comprising: a plurality of laminated substrates, each of which is provided with a tracing layer, a plurality of through holes, and a plurality of electrical connection vias; the tracing layer consisting of a plurality of induction coils, which are respectively arranged around an outer side of one of the through holes, and the induction coils on one substrate being extended through the electrical connection vias to electrically connect to the tracing layer on an adjacent substrate; and each of the through holes having a metal rod inserted therein.

2. The three-phase driven stator structure as claimed in claim 1, wherein the induction coils respectively have a three-phase output, and the three phases being represented by alphabets U, V, and W; and the number of the induction coils provided on each tracing layer is 3, 6, 9, or other multiples of 3, and the induction coils being arrayed side by side but spaced from one another.

3. The three-phase driven stator structure as claimed in claim 1, wherein the induction coils are formed on the substrates through one of printing and etching.

4. The three-phase driven stator structure as claimed in claim 1, wherein the electrical connection vias are internally provided with an electrically conducting material, with which the induction coils on one substrate can be extended to electrically connect to the induction coils of the tracing layer on an adjacent substrate; and the electrical conducting material being selected from the group consisting of copper, nickel, and silver.

5. A fan using a three-phase driven stator structure comprising:

a frame having a bottom, a shaft barrel upward extended from the bottom, a bearing provided in the shaft barrel;

a rotor having a hub, a plurality of blades extended radially outward from an outer circumferential surface of the hub, a magnetic element disposed below the hub, and a shaft vertically extended downward from a center of a lower inner side of the hub correspondingly inserted into the bearing in the shaft barrel to be rotatably connected to the shaft barrel of the frame; and a three-phase driven stator including: a plurality of laminated substrates disposed on the bottom of the frame and located around an outer side of the shaft barrel, each of which is provided with a tracing layer, a plurality of through holes, and a plurality of electrical connection vias; the tracing layer consisting of a plurality of induction coils, which are respectively arranged around an outer side of one of the through holes, and the induction coils on one substrate being extended through the electrical connection vias to electrically connect to the tracing layer on an adjacent substrate; and each of the through holes having a metal rod inserted therein.

6. The fan as claimed in claim 5, wherein the three-phase stator structure is provided on each substrate with the tracing layer consisting of induction coils respectively having a three-phase output, and the three phases being represented by alphabets U, V, and W; the number of the induction coils provided on each tracing layer being 3, 6, 9, or other multiples of 3, and the induction coils being arrayed side by side but spaced from one another.

7. The fan as claimed in claim 5, wherein the induction coils are formed on the substrates through one of printing and etching.

8. The fan as claimed in claim 5, wherein the electrical connection vias are internally provided with an electrically conducting material, with which the induction coils on one substrate can be extended to electrically connect to the induction coils of the tracing layer on an adjacent substrate; and the electrical conducting material being selected from the group consisting of copper, nickel, and silver.

* * * * *